(12) United States Patent
Vishwari et al.

(10) Patent No.: US 11,206,152 B2
(45) Date of Patent: Dec. 21, 2021

(54) METHOD AND APPARATUS FOR MANAGING MISSED EVENTS

(71) Applicant: Samsung Electronics Co., Ltd., Suwon-si (KR)

(72) Inventors: Nitin Vishwari, Bangalore (IN); Nitish Varshney, Bangalore (IN); Prateek Singh Chauhan, Bangalore (IN); Arun Yadav, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/556,972

(22) Filed: Aug. 30, 2019

(65) Prior Publication Data

US 2020/0076637 A1  Mar. 5, 2020

(30) Foreign Application Priority Data

Aug. 30, 2018 (IN) .............................. 201841032589
Jan. 16, 2019 (IN) ............................ 2018 41032589

(51) Int. Cl.
    *H04L 12/28* (2006.01)
(52) U.S. Cl.
    CPC ........ *H04L 12/282* (2013.01); *H04L 12/2827* (2013.01)
(58) Field of Classification Search
    CPC ..................... H04L 12/282; H04L 12/2827
    See application file for complete search history.

(56) References Cited

U.S. PATENT DOCUMENTS

| | | | |
|---|---|---|---|
| 6,411,891 B1 | 6/2002 | Jones | |
| 9,152,737 B1* | 10/2015 | Micali | .......... H04L 12/2823 |
| 9,514,424 B2* | 12/2016 | Kleinbart | .......... G06Q 10/06 |
| 9,554,356 B2* | 1/2017 | Dotan-Cohen | ..... H04M 7/0033 |
| 2005/0282528 A1* | 12/2005 | Charpentier | ........ H04W 68/025 |
| | | | 455/414.2 |
| 2006/0203620 A1 | 9/2006 | Bedingfield, Sr. | |
| 2009/0305744 A1 | 12/2009 | Ullrich | |
| 2014/0032671 A1 | 1/2014 | Chhatrapati et al. | |
| 2014/0253319 A1 | 9/2014 | Chang | |

(Continued)

FOREIGN PATENT DOCUMENTS

| | | |
|---|---|---|
| CN | 107170212 A | 9/2017 |
| WO | 2016/057564 A1 | 4/2016 |

(Continued)

OTHER PUBLICATIONS

International Search Report dated Dec. 9, 2019, issued in an International Application No. PCT/KR2019/011159.

(Continued)

*Primary Examiner* — Sm A Rahman
(74) *Attorney, Agent, or Firm* — Jefferson IP Law, LLP

(57) ABSTRACT

A method for managing a missed event in an Internet of Things (IoT) environment and an apparatus therefor are provided. The method includes determining a sequence of events executed by a user, identifying a first event among the sequence of events as a critical event, detecting a missed event among the sequence of events, determining a significance weight of the missed event and performing the missed event based on at least one of the significance weight of the missed event or the critical event.

17 Claims, 20 Drawing Sheets

(56) References Cited

U.S. PATENT DOCUMENTS

| | | | |
|---|---|---|---|
| 2014/0298097 A1* | 10/2014 | Illouz | G06F 11/0793 714/37 |
| 2016/0217672 A1 | 7/2016 | Yoon et al. | |
| 2016/0259308 A1 | 9/2016 | Fadell et al. | |
| 2020/0036592 A1* | 1/2020 | Kholaif | H04L 41/0886 |

FOREIGN PATENT DOCUMENTS

| | | | |
|---|---|---|---|
| WO | 2016-205366 A1 | 12/2016 | |
| WO | 2018-049430 A2 | 3/2018 | |
| WO | 2018-169372 A1 | 9/2018 | |

OTHER PUBLICATIONS

Chanda et al.; Real-time Action Prompting on Streaming Sensor Data for detecting Routine Deviations in Smart Homes, 2017.
Extended European Search Report dated Jul. 9, 2021, issued in European Patent Application No. 19856106.0-1216.

* cited by examiner

Day 1

Day 2

Day 3

Day 4

METHOD AND APPARATUS FOR MANAGING MISSED EVENTS

CROSS-REFERENCE TO RELATED APPLICATION(S)

This application is based on and claims priority under 35 U.S.C. § 119 of an Indian provisional application number 201841032589, filed on Aug. 30, 2018, in the Indian Patent Office, and of an Indian patent application number 201841032589, filed on Jan. 16, 2019, in the Indian Patent Office, the disclosures of each of which is incorporated by reference herein in its entirety.

BACKGROUND

1. Field

The disclosure relates to management of reminders in an Internet of Things (IoT) environment. More particularly, the disclosure relates to a method and an apparatus for managing reminders of missed actions in an IoT environment.

2. Description of Related Art

Currently, there are methods and systems, which can identify a schedule including one or more events. The schedule can be identified with a certain confidence factor. In an example, the identified schedule can be a user routine, where the events can be considered to be actions or activities performed by the user and/or one or more user devices within the routine. The identified routine can be provided to a user for confirmation prior to automating the identified routine. Accordingly, the user may or may not choose to automate the routine.

The methods and systems can provide an alert or notification to a user if an event within the schedule is not executed or is missed. However, the appropriate time at which the notification is to be prompted to the user may be unknown.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method of providing an intelligent response on an electronic device.

Additional aspects will be set forth in part in the description which follows and, in part, will be apparent from the description, or may be learned by practice of the presented embodiments.

In accordance with an aspect of the disclosure, methods and systems for managing reminders for missed or unexecuted events within a (identified) schedule in an Internet of Things (IoT) environment are provided. A method includes determining at least one critical event, which can split the identified schedule into parts, and monitoring execution of the different events. If a scheduled event is not executed, the method includes providing a notification prior to/after the execution of the critical event. The method includes monitoring frequency of execution of different events in the identified schedule, and execution of events in a particular order as in the identified schedule. The method includes modifying the identified schedule based on the monitoring. The method includes re-identifying critical events based on changes or modifications in the schedule.

In accordance with another aspect of the disclosure, a method of managing a missed event in an Internet of Things (IoT) environment is provided, The method includes determining a sequence of events executed by a user, identifying a first event among the sequence of events as a critical event, detecting a missed event among the sequence of events, determining a significance weight of the missed event, and performing the missed event based on at least one of the significance weight of the missed event or the critical event.

The method may further include identifying, within the sequence of events, an action of prompting a notification of the missed event.

In the method, the identifying of the first event among the sequence of events as the critical event includes classifying the first event as the critical event based on information of the IoT environment, and the information of the IoT environment comprises at least one of a state of devices included in the IoT environment or a usage pattern of the devices included in the IoT environment.

In the method, the classifying of the first event as the critical event includes classifying the first event as the critical event based on the state of the devices included in the IoT environment not changing for a predetermined time period.

In the method, the classifying of the first event as the critical event includes classifying the first event as the critical event based on a time interval between the first event and a second event prior to or subsequent to the first event exceeding a predetermined time.

In the method, the critical event splits the sequence of events to at least two sub sequence of events.

The method may further include determining, among the sequence of events, an event which is least executed for a predetermined time period, generating a second sequence of events by removing the event from the sequence of events, and identifying a second critical event among the second sequence of events.

In the method, the performing of the missed event includes performing the missed event based on a time interval between at least two events in the sequence of events after the detecting of the missed events.

The method may further include selecting the time interval which is greater than a threshold time interval calculated from the sequence of the events.

The method may further include providing a notification of the missed event to the user based on the significance weight of the missed event or the critical event.

In the method, the providing of the notification of the missed event includes providing the notification of the missed event immediately when the significance weight of the missed event is higher than a threshold value.

In accordance with another aspect of the disclosure, an apparatus for managing a missed event in an Internet of Things (IoT) environment is provided. The apparatus includes a memory, and at least one processor couple to the memory and configured to determine a sequence of events executed by a user, identify a first event among the sequence of events as a critical event, detect a missed event among the sequence of events, determine a significance weight of the missed event, and perform the missed event based on at least one of the significance weight of the missed event or the critical event.

Other aspects, advantages, and salient features of the disclosure will become apparent to those skilled in the art from the following detailed description, which, taken in conjunction with the annexed drawings, disclose various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
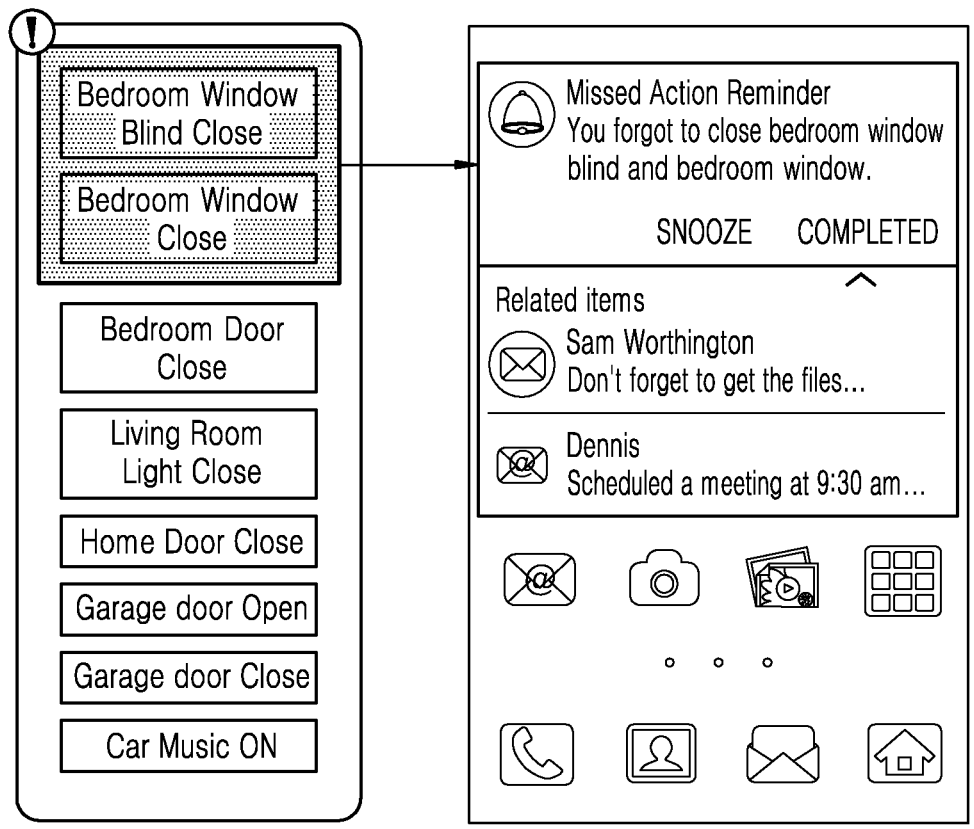
FIG. 1 illustrates an example schedule including a series of activities where a user misses or forgets to perform a couple of activities according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the terms "1st" or "first" and "2nd" or "second" may use corresponding components regardless of importance or order and are used to distinguish one component from another without limiting the components.

The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Embodiments herein disclose methods and systems for managing reminders/notifications for missed or unexecuted events within a schedule in an Internet of Things (IoT) environment. Embodiments disclosed herein include determining at least one critical event in the identified schedule. The embodiments include monitoring execution of the different events. If an event has not been executed, then the embodiments include providing a notification prior to/after the execution of the critical event. The embodiments include monitoring frequency of execution of events and execution of events in a particular order, as in the identified schedule. The embodiments include modifying the identified schedule based on the monitoring. The embodiments include identifying critical events based on changes or modifications in the schedule.

The terms reminder and notification may be used interchangeably. The terms event and action/activity may be used interchangeably as well.

Referring now to the drawings, and more particularly to FIGS. 1 through 12, where similar reference characters denote corresponding features consistently throughout the figures, there are shown preferred embodiments.

The methods and systems can provide an alert or notification to a user if an event within the schedule is not executed or is missed. The schedule may include a sequence of events. However, the appropriate time at which the notification is to be prompted to the user may be unknown. In an example, if the event is not executed at a scheduled time, the notification can be prompted after a predefined period post the scheduled time. The notification to execute the missed event can also be prompted after all events in the schedule have been executed or prior to the start of execution of the subsequent event in the schedule.

If the notification is provided too early (i.e., after the predefined period after the lapse of the scheduled time of executing the event), the user might be annoyed. If the notification is provided too late (i.e., after all the events in the schedule have been executed), there might be security issues especially when the missed event is critical. In such a case the user may need to undo or redo the events subsequent to the missed event. If the notification is provided prior to the start of the subsequent event and the subsequent event is scheduled to be executed after a lapse of a long time from the prior event, then there can be a delay in prompting the notification.

FIG. 1 illustrates an example schedule including a series of activities where a user misses or forgets to perform a couple of activities according to an embodiment of the disclosure.

Referring to FIG. 1, the user failed to close the bedroom window blinds and the bedroom window among the schedule. The user may initiate closing the bedroom door as a subsequent activity. The system may provide a notification, i.e., a missed action reminder, indicating that the user had forgotten closing the bedroom window blinds and the bedroom window. Providing the notification after completion of all activities, i.e., after the user turns on the car music, can annoy or embarrass the user as the user needs to perform all the activities of the routine again after closing the bedroom window blinds and the bedroom window at times.

Figure 2:
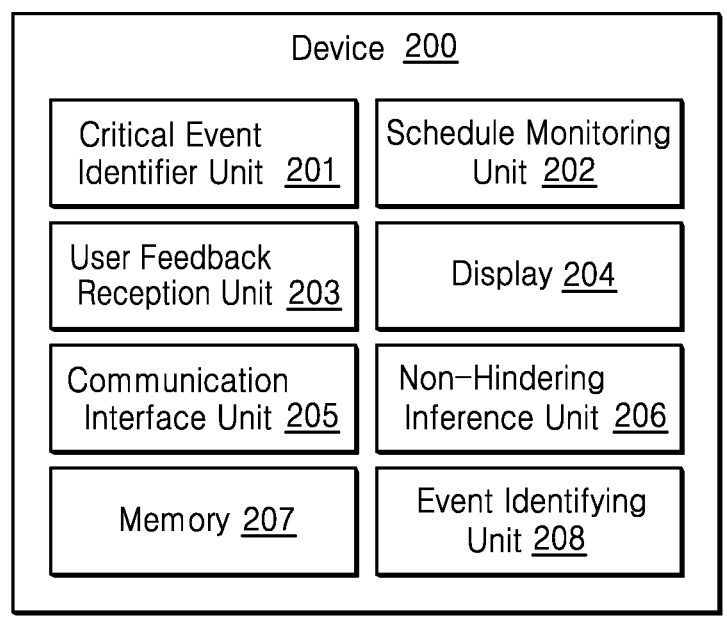
FIG. 2 illustrates a block diagram a device 200 for managing reminders/notifications of non-occurrence or non-execution of events, according to an embodiment of the disclosure.

FIG. 2 illustrates a block diagram a device 200 for managing reminders/notifications of non-occurrence or non-execution of events, according to an embodiment of the disclosure.

Referring to FIG. 2, the device 200 may include a critical event identifier unit 201, a schedule monitoring unit 202, a user feedback reception unit 203, a display 204, a communication interface 205, a non-hindering inference unit 206, a memory 207, and an event identifying unit 208. Examples of the device 200 can be, but not limited to, a mobile device, a smart phone, a tablet, a home assistant device, a wearable device, an Internet of Things (IoT) device, a vehicle infotainment device, and so on. The critical event identifier unit 201, the schedule monitoring unit 202, the user feedback reception unit 203, a communication interface 205, a non-hindering inference unit 206, and an event identifying unit 208 may be implemented as at least one hardware processor.

The device 200 can automatically identify schedules including a series of events. The schedules can be identified with a certain confidence over a period of time such as a number of days. The identified schedules can be stored in the memory 207. The device 200 can provide notifications when events in the schedules are not executed or missing. The notifications can be provided using one or more interfaces included in the device 200 and/or another device that can be accessible by the user.

The critical event identifier unit 201 can identify critical events within the schedule. The events in the schedule can be classified as critical or non-critical. The critical event identifier unit 201 can identify events which may be qualified as critical. Such identified events in the schedule can be classified as critical.

In an embodiment, an event can be identified or classified as critical based on information of an environment in which the device 200 is situated. The information of the environment can indicate state of other devices in the environment and/or the pattern of usage of the other devices. The other devices can be associated with the events that are to be executed in the schedule. In an example, if the state of the other devices during the execution of an event does not vary for a predetermined time period, the event can be classified as critical.

In another embodiment, an event can be identified as critical based on a time interval between execution of the event and the execution of another event prior to or subsequent to the event. In an example, if the time interval between the two events exceed a predetermined time, one of the two events can be identified as a critical event.

In another embodiment, if the device 200 may detect an execution of additional events that are not a part of the schedule, an event which precedes or succeeds the execution of the additional events can be identified as a critical event. After executing the additional events, the events which have been originally scheduled can be executed.

The other events (apart from the critical events) can be classified as non-critical. The critical events can split the schedule into a plurality of parts (sub-schedules) where events in a sub-schedule can be independent from events in another sub-schedule. The critical event identifier unit 201 can also identify a plurality of critical events in the schedule.

The schedule monitoring unit 202 can monitor execution of the events in the schedule and determine whether execution of an event has been missed. The monitoring may include determining the order of execution of events within the schedule, frequency of execution of events in the schedule, and/or time of execution of events in the schedule. If it is determined that an event has not been executed, the display 204 can display at an appropriate time, a notification indicating that the event has not been executed.

In an embodiment, when an event in a sub-schedule has not been executed or missed, the appropriate time can be the point of initiating a critical event, subsequent to the missed event. The execution of the critical event is initiated after the execution of all events within the sub-schedule in which the missed event is scheduled. In other words, the notification indicating that the event is missed, can be provided prior to or subsequent to an execution of the critical event.

If a schedule includes multiple critical events, and an event in a sub-schedule has been missed, a notification can be displayed at the initiation of execution of a critical event, which is scheduled for execution after the last event in the sub-schedule is executed.

If a missed event has been scheduled for execution in the last sub-schedule of the schedule, a notification can be provided to and displayed at the device 200 after a lapse of a predefined time period from the execution of the last event in the schedule.

If a missed event has been scheduled for execution in the last sub-schedule of the schedule and the missed event is the last event to be executed in the schedule, a notification can be provided and displayed after a lapse of a predefined time period from the expected execution time of the missed event.

The schedule monitoring unit 202 may monitor the frequency of execution of different events in a schedule and order of execution of the different events in the schedule. In an example, the schedule may include a sequence of events. The sequence can be depicted as a graph in which the edges of the graph can be directional. The events can be represented by nodes of the graph and the direction of the edges can indicate the order of execution of events within the schedules. Consider that the initial graph is constructed based on the identified schedules. Based on monitoring of execution of the events, the order of execution of different events, frequency of execution of different events, and frequency of execution of events in a particular order can be determined.

Each edge in the graph, connecting at least two nodes (events), can be assigned with a weight. When events are executed in a specific order, the weight of an edge connecting the nodes may increase. In an example, consider that the at least two events are executed in the specific order (signified by the direction of the edge connecting the at least two events) 10 times. The weight assigned to the edge can be 10. The schedule monitoring unit 202 may set a threshold weight based on the number of days for which the schedule has been monitored. In an example, the schedule is monitored for 10 days. The threshold weight may be set as 5 when the at least two events have been executed in the specific order once for the 10 days. If the weight of an edge is less than the threshold weight, the edge can be removed. The removal of the edge may imply that at least one event connected to the removed edge might not have been executed, or is not frequently executed; and the at least one event connected to the removed edge may not be executed in an order indicated by the direction of the removed edge. The less frequent events may be removed from the schedule. The removal of the edges and the less frequent events can lead to modification of the schedule.

The critical event identifier unit 201 can identify critical events based on the modification of the schedule. The criterion which can qualify an identified event as critical is that the critical event can segment the schedule into a plurality of sub-schedules.

In an embodiment, the process of identifying critical events may include determining probability of different events to be qualified as a critical event. Based on the determined probability, prospective critical events can be identified. The probability of a prospective critical event to be qualified as a critical event can be based on the threshold weight and weight of an edge passing over the prospective critical event, if any. If the weight of the edge passing through the critical event is low, the probability of a prospective critical event to be qualified as a critical event may increase. Similarly, if the weight of the edge passing through the critical event is high, the probability of a prospective critical event to be qualified as a critical event may decrease.

The critical event identifier unit 201 may determine the probabilities of the prospective critical events. The critical event identifier unit 201 can identify at least one prospective critical event as a critical event.

In an embodiment, the critical event identifier unit 201 can indicate that a particular prospective critical event has been identified as a critical event. The display 204 can display the particular prospective critical event identified as the critical event for a user. The user can approve or disapprove the prospective critical event as a critical event through the user feedback reception unit 203. In an embodiment, the user feedback reception unit 203 can be a touch screen, one or more switches, or buttons.

The probability of an event to be qualified as a critical event can be based on the edges passing through the event in consideration. The passing edges can be new edges which can be added to the graph, if events connected by a new edge are executed in an order, indicated by the direction of the new edge, for a certain number of times such that the assigned weight of the new edge is greater than the threshold weight. When the weight of the new edge is less than the threshold weight, the new edge can be regarded as temporary. When the weight of the new edge is greater than or equal to the threshold weight, the new edge can be regarded as permanent. The new edge can be, therefore, added to the graph. The new edge can impact the criticality of the events.

In a scenario, an identified schedule includes three events, where the first event is executed followed by the second event and thereafter the third event is executed. The three events may be regarded as nodes forming a graph. Assuming that the second event is identified as a critical event, a notification is provided at the initiation of the second event in case the first event is missed. If the schedule monitoring unit 202 detects that the third event is executed followed by the execution of the first event, the schedule monitoring unit 202 may inform the critical event identifier unit 201 that a back edge has appeared in the schedule, connecting the third event to the first event, which is passing through the second event. In this scenario, the critical event identifier unit 201 is likely to determine a new critical event. Therefore, the second event is no longer qualified as a critical event. The third event can be identified as a critical event, where notifications indicating missing of the first and/or second events can be provided prior to or after the execution of the third event.

The communication interface 205 of the device 200 can send notifications to the user located remote from the device 200 through a cloud server. The user can receive the notification from the cloud server through a device accessible to the user in the remote location. The notification can indicate that at least one event has been missed or not executed. For example, the notification can be sent using Code Division Multiple Access (CDMA), Time Division Multiple Access (TDMA), Frequency Division Multiple Access (FDMA), orthogonal FDMA (OFDMA), Single-Carrier FDMA (SC-FDMA), and so on.

In a scenario, the schedule monitoring unit 202 determines that at least one event in the schedule is missed and there is no possibility of providing a notification throughout the execution of subsequent events within the entire schedule. In such a scenario, the non-hindering inference unit 206 can identify events in another schedule. In an example, consider that that an event in a first schedule is missed and there is no possibility of providing notifications, while other events in the first schedule are executed. In such circumstances, the non-hindering inference unit 206 can identify events in a second schedule. The missed event in the first schedule can be executed after the execution of the identified events in the second schedule, during the execution of the identified events in the second schedule or during the initiation of the identified events in the second schedule.

In an example, the events in the first schedule and the second schedule can be executed by the same user.

In another example, the events in the first schedule can be executed by the first user and the events in the second schedule can be executed by the second user. In such scenarios, the events that are supposed to be executed by the first user can be executed by the second user.

In an embodiment, the events in the second schedule can be determined by the non-hindering inference unit 206 based on a knowledge base. An example of the knowledge base can be an ontology.

In another embodiment, the events that are identified in the second schedule by the non-hindering inference unit 206 may belong to an event group. The event group can include a plurality of events. Consider that the missed event in the first schedule is a part of a first event group, and the events identified in the second schedule are a part of a second event group. The non-hindering inference unit 206 can determine probabilities of co-occurrence between the first event group and other event groups. The schedule including events belonging to an event group, having the highest probability of co-occurrence with the event group including the missed event can be chosen. In an example, the non-hindering inference unit 206 can choose the second schedule. The identified event belongs to the second event group and the missed event belongs to the first event group. The probability of co-occurrence between the first event group and the second event group is the highest compared to the probabilities of co-occurrence between the first event group and other event groups. Therefore, the non-hindering inference unit 206 may choose the second schedule based on the probability of the co-concurrence.

In another embodiment, the identified events can be associated with a quality score. The quality scores associated with the different events in the second schedule can be different. The quality score can be based on state of each event in the second schedule, involvement of a user in each of the events of the second schedule, and/or activity of at least one user in the environment where the identified events are executed.

In an example, if an execution of multiple events in the first schedule is missed, the missed events can be scheduled in multiple schedules based on appropriateness for scheduling the missed events in each of the multiple schedules.

The event identifying unit 208 can identify events and construct schedules. The event identifying unit 208 can prepare schedules including events where the schedules can include critical events. The schedule monitoring unit 202 can provide a notification to the user prior to or subsequent to an execution of a critical event in the constructed schedule.

The event identifying unit 208 can identify events that can be executed by the user over a period of time. These events can be a part of an existing schedule or a schedule that has to be constructed. Among such events, a critical event can be identified. Once the schedule is constructed, the schedule monitoring unit 202 can provide a notification to the user prior to or subsequent to an execution of the identified critical event.

The display 204 can display the constructed schedule to the user. In an embodiment, the user can choose to automate the schedule, manually perform the schedule or reject the schedule. In an embodiment, the user can choose to automate one or more events in the schedule, manually perform one or more events in the schedule or reject one or more events in the schedule. In an embodiment, the user can edit the schedule where the edits may include adding events to the schedule, deleting events from the schedule, and modifying events present in the schedule. The user can indicate the choice through the user feedback reception unit 203. If the user chooses to automate the schedule, the schedule monitoring unit 202 can provide notifications to the user when the execution of events in the schedule is missed.

Consider that the user has prepared a schedule including a plurality of events. The schedule monitoring unit 202 can monitor execution of different events. If it is detected that the user has been executing an event over a predefined period of time—several days, and the event is not included in the schedule, the event can be determined as suitable to be included in the schedule prepared by the user. The schedule prepared by the user may include a critical event. The schedule monitoring unit 202 can suggest the user to include the suitable event in the schedule by providing a notification. In an embodiment, the schedule monitoring unit 202 can provide the notification to the user to include the suitable event in the schedule prior to an execution of the critical event.

In an embodiment, the suitable event can be scheduled to be executed in the schedule prior to an execution of the critical event or after the execution of the critical event.

Although FIG. 2 illustrates units of the device 200, it is to be understood that other embodiments are not limited thereon. In other embodiments, the device 200 may include less or more number of units. Further, the labels or names of the units are used only for illustrative purpose and does not limit the scope of the disclosure. One or more units can be combined together to perform same or substantially similar function in the device 200.

Figure 3A:
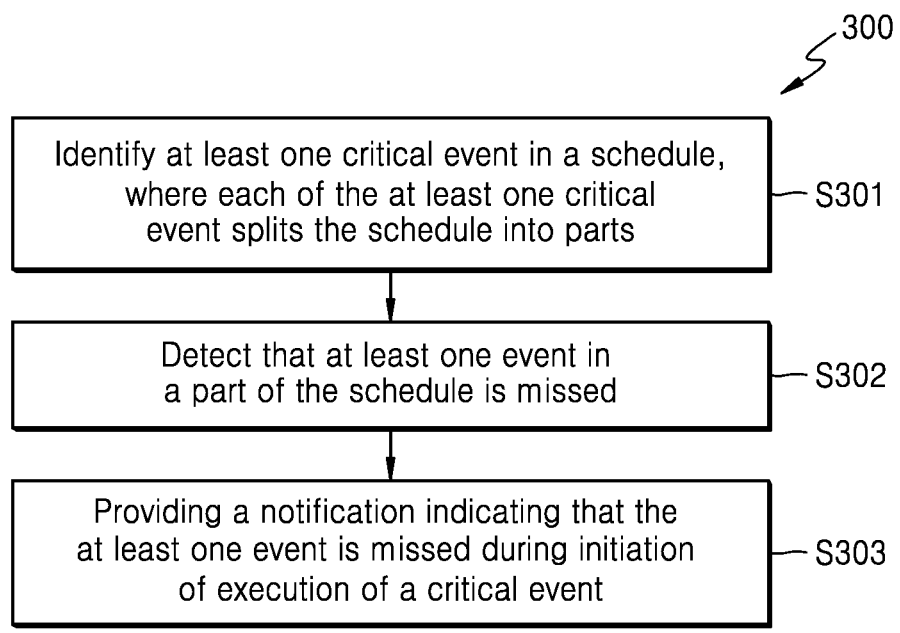
FIG. 3A is a flowchart illustrating a method for managing notifications of missed events in a schedule, according to an embodiment of the disclosure.

FIG. 3A is a flowchart 300 illustrating a method for managing notifications of missed events in a schedule, according to an embodiment of the disclosure.

Referring to FIG. 3A, in operation S301, the method includes identifying at least one critical event in a schedule. The status of the rest of the events in the schedule can be considered as non-critical. The at least one critical event can split the schedule into a plurality of parts. The method further includes monitoring the execution of different events in the schedule. The monitoring may include determining the order of execution of events within the schedule, frequency of execution of events in the schedule, and/or time of execution of events in the schedule. The method further includes updating the status of criticality of the event based on the monitoring. The method may further include modifying the schedule based on the monitoring.

In an example, the schedule may be a graph including nodes which are the events in the schedule. The graph can include edges which connect the events. The order of execution of events can be determined using the direction of the edges.

The method may include assigning a weight to all the edges of the graph. The schedule can be modified according to the assigned weights. When events connected by an edge are executed in an order based on the direction of the edge, the weight of the directional edge can increase. In an example, the events connected to the directional edge are executed once daily. If the schedule is monitored for 8 days, the weight assigned to the directed edge may be 8.

An edge can be considered to be permanent, if the weight of the edge is greater than the threshold weight. The threshold weight can be based on the temporal length of monitoring. In the above example, if the monitoring period is 8 days, the threshold weight can be 3, 4, 5, and so on. If the weight of an edge is less than the threshold weight, the edge may be considered to be temporary and consequently removed.

When an edge is removed, the schedule can be modified. This can indicate that an event connected to the edge is either not executed or not executed frequently. This is because the weight of the edge can increase if events connected to the edge are executed, or the events are connected to the edge are executed in an order based on the direction of the edge. The method may include re-identifying critical events after the modification of the schedule.

In an embodiment, it is determined that two events are executed in a sequential order once per day for 5 consecutive days, where initially the schedule does not indicate the sequential execution of the two events. The weight assigned to an edge connecting the two events is 5. If the threshold weight is equal to or less than 5, then an edge connecting the two events will be added to the schedule. The embodiments can re-identify critical events after the modification of the schedule. In an example, if the new edge passes over an event with status as critical, the event may no longer be regarded as critical.

In an embodiment, the method may include determining, for each event (node), a probability for being qualified as a critical event. The probability of an event being qualified as a critical event may be based on the threshold weight, the weight assigned to an edge connected to the event, and the weight of an edge passing through the event, if any. Based on the probability, the critical status can be assigned to the event.

The method may further include displaying the at least one identified critical event, once the critical events are identified, and receiving a feedback indicating approval or disapproval of the status of events as critical.

In an embodiment, the events can be identified as critical based on state of at least one device in the environment, in which the events in the schedule are executed during execution of the critical event. The at least one device can be associated with the execution of events in the schedule. The state of operation can correspond to the state of operation of the at least one device and/or pattern of usage of the at least one device.

In an embodiment, the events can be identified as critical based on a time interval between the execution of the critical event the and execution of an event preceding the critical event and/or a time interval between the execution of the critical event and the execution of an event succeeding the critical event.

In an embodiment, the events can be identified as critical based on an execution of additional events that are not included in the schedule. The additional events are executed prior to or after the execution of the event identified as critical.

In operation S302, the method may include detecting that at least one event in a part of the schedule is missed or has not been executed. The detection can be confirmed if an event, which is scheduled for execution subsequent to the missed event, is initiated. The detection can be confirmed by non-execution of the at least one missed event at a scheduled time. In an embodiment, the number of non-executed events scheduled for execution prior to the critical event can be counted for detecting missed events.

In operation S303, the method may include providing a notification indicating non-execution—missing—of the at least one event during initiation of execution of a critical event. The critical event can be scheduled for execution after all events in the part-sub-schedule, where the at least one missed event is scheduled for execution, are executed. If a user is placed in a remote location, the method may include transmitting the notification to a device accessible to the user in the remote location through a cloud server.

In an embodiment, the method may include scheduling execution of the at least one missed event in another schedule if the notification indicating the non-execution of the at least one missed event cannot be provided. If the at least one missed event was scheduled for execution in a first schedule, the method may include identifying at least one event in a second schedule, where the at least one missed event can be scheduled for execution prior to an execution of the at least one event in the second schedule during the execution of the at least one event in the second schedule, or after an execution of the at least one event in the second schedule. The events in the first schedule and the second schedule can be executed either by the same user or different users.

The at least one event in the second schedule can be determined based on a knowledge base, probability of co-occurrence between the at least one event in the second schedule and the at least one missed event in the first schedule, and/or a quality score associated with the at least one event in the second schedule.

It is to be noted that if an execution of a plurality of events in the first schedule is missed and if it is not possible to provide a notification or reminder prior to or after the execution of any event in the first schedule, the plurality of missed events can be scheduled or included in a plurality of schedules. For the sake of simplicity, the previous example states that the missed events of the first schedule are scheduled only in the second schedule. However, the missed events can be scheduled for execution in multiple schedules.

The various actions in the flowchart 300 may be performed in the order presented, in a different order, or simultaneously. Further, in some embodiments, some actions listed in FIG. 3A may be omitted.

Figure 3B:
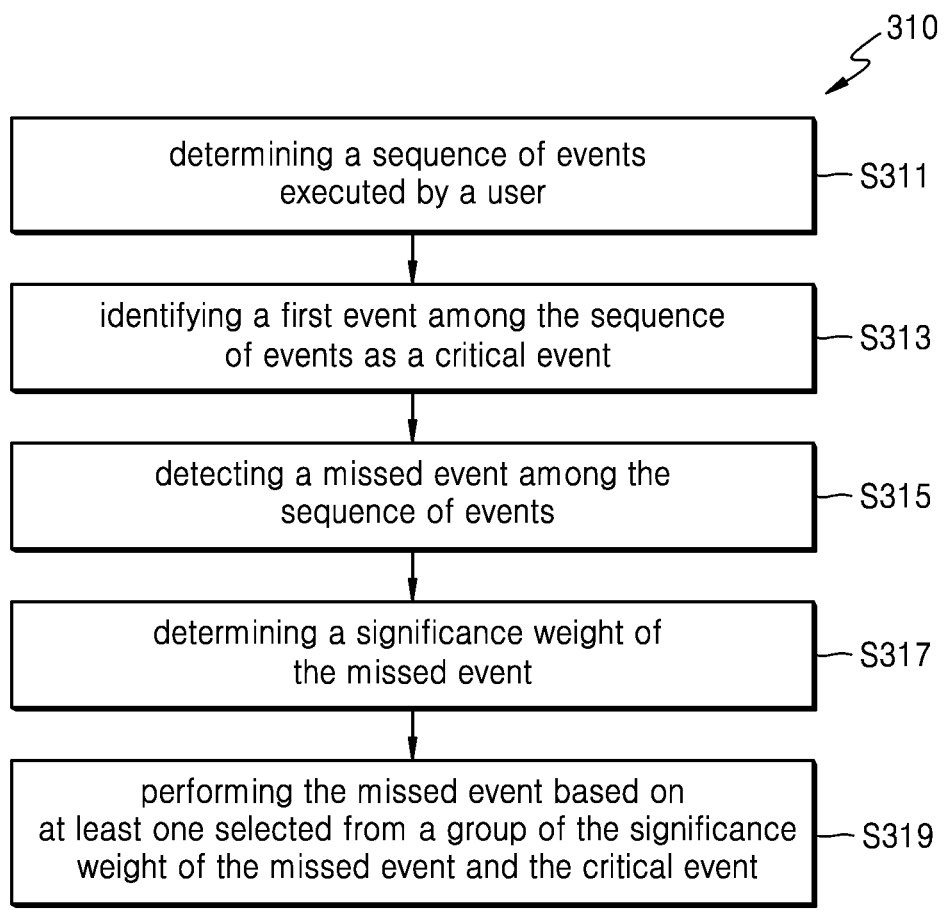
FIG. 3B is a flowchart illustrating a method for managing missed events in a schedule, according to an embodiment of the disclosure.

FIG. 3B is a flowchart 310 illustrating a method for managing missed events in a schedule, according to an embodiment of the disclosure.

Referring to FIG. 3B, in operation S311, the method may include determining a sequence of events to be executed by a user. The sequence of events is monitored for a predetermined time period (e.g. 5 consecutive days).

In operation S313, a critical event among the sequence of events is determined. The critical event may be identified based on information of an IoT environment which includes at least one selected from a group of state of devices executing the events and usage pattern of the devices in the IoT environment. If the state of the devices does not vary or change for a predetermined time period, the first event may be classified as critical. In an embodiment, if a time interval between the first event and a second event executed prior to or subsequent to the first event exceeds a predetermined time—for example, 30 minutes, 1 hour or 1 day, the first event may be classified as the critical event. In general, the critical event may divide the sequence of events into two sub-sequence of events. If two consecutive events may be executed within 5-10 minutes in general, it is desirable to determine 20-30 minutes as the predetermined time.

Figure 6A:
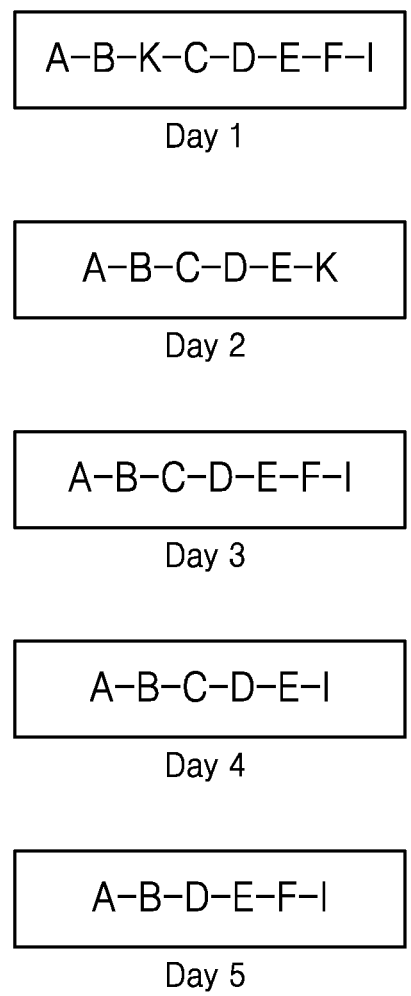
FIG. 6A illustrates an example of updating critical status of events based on a modification of a schedule, according to an embodiment of the disclosure.
Figure 6B:
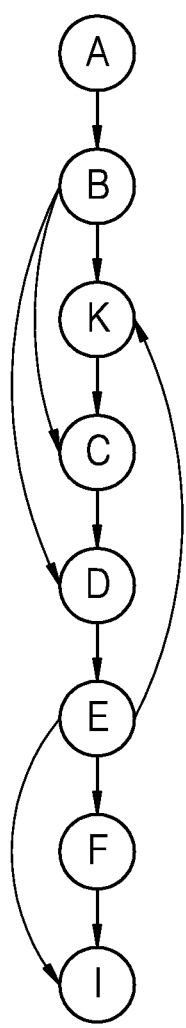
FIG. 6B illustrates a graph representing the order of execution of the events over a predetermined time period, according to an embodiment of the disclosure.
Figure 6C:
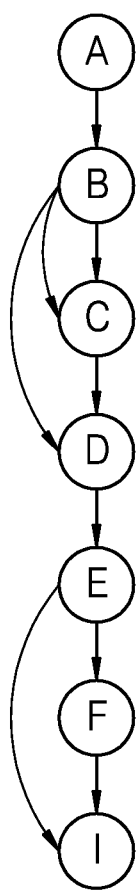
FIG. 6C illustrates a graph representing the order of execution of the events over a predetermined time period, according to an embodiment of the disclosure.

In an embodiment, if there is an event which is least executed for a predetermined time period, the event may be removed from the sequence of events as depicted in FIG. 6B and FIG. 6C. Referring to FIG. 6B and FIG. 6C, the event K is the least executed event during the predetermined time period of 5 days. If the event K is removed, a new sequence of events is generated and a new critical event D may be identified as a critical event because the event D divides the sequences into two sub-sequence of events which are A-B-C-D (including A-B-D) and E-F-I (including E-I).

Figure 10A:
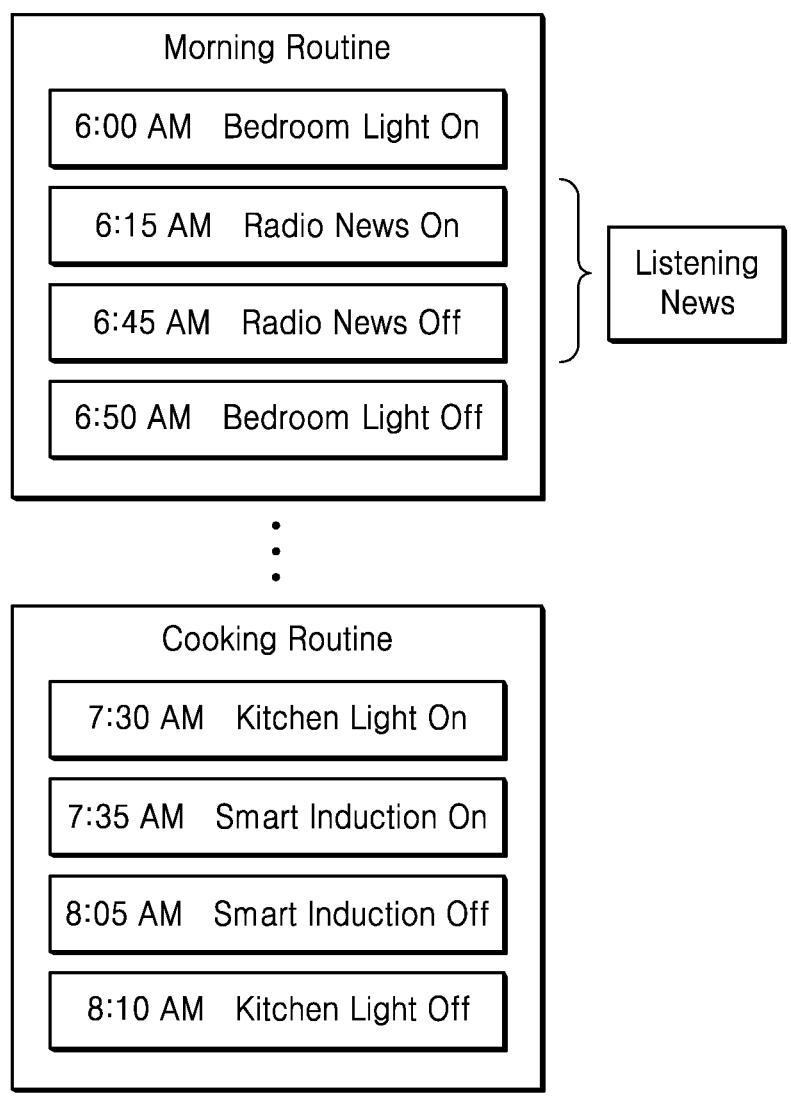
FIG. 10A illustrates an example of inserting a missed activity to another routine according to an embodiment of the disclosure.

In operation S315, a missed event among the sequence events is detected. In operation S317, a significance weight of the missed event may be determined based on a type of the missed event such as a degree of urgency, emergency and/or timing. The significance weight of the missed event may contribute to the timing of when to notify the user of the missed events and/or the timing of when to perform the missed events later in the sequence of events. For example, if the significance weight of the missed event is higher than a threshold value, the notification of the missed event may be provided to the user immediately. In an embodiment, referring to FIG. 1, the threshold value may be set to 3 and the event of 'Home Door Close' may have the significance weight 4 due to the security reason and the event of 'Car Music On' may have the significance weight 1 because the event of 'Car Music On' has no substantial significance among the sequence events. Likewise, the event of 'Garage door Close' may have the significance weight 4 due to the security reason. Referring to FIG. 10A, the event of "Smart Induction OFF" may have high significance weight because the event is related to a fire—safety of a house. The significance weight of each of the event may be determined based on the user setting and/or the criticality of the event. If the event is critical and divides the sequence into a plurality of sub-sequences, the event may have high significance weight because the event may be highly likely to be relevant to the security issue—"Home Door Close' or 'Garage Door Close'. If the event has high significance weight and is missed, the prompt notification may be provided to the user.

In operation S319, the missed event may be performed based on the significance weight of the missed event and/or the critical event. In an embodiment, an action of prompting a notification of the missed event may be identified and provided to the user before performing the missed event.

Figure 4A:
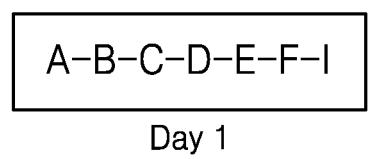
FIG. 4A depicts an example schedule including a plurality of events executed for four days, according to an embodiment of the disclosure.
Figure 4A:
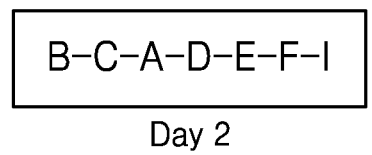
Figure 4A:
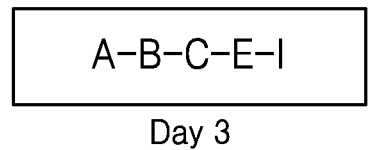
Figure 4A:
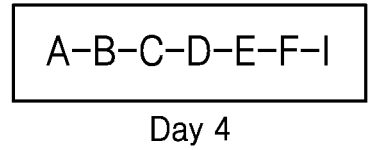

FIG. 4A depicts an example schedule including a plurality of events executed for four days, according to an embodiment of the disclosure.

Referring to FIG. 4A, the events can be represented by A, B, C, D, E, F, and I. The order of execution of events on Day 1 can be A-B-C-D-E-F-I. Thus, all events are executed on Day 1. The order of execution of the events on other days may be different. As illustrated in FIG. 4A, the order of execution on Day 2 can be B-C-A-D-E-F-I. The schedule on a particular day may not include all the events. I.e., some of the events may not be executed on certain days. As illustrated in FIG. 4A, the events executed on Day 3 may be A, B, C, E, and I and the order of execution can be A-B-C-E-I. The schedule on Day 4 is same as that of Day 1.

Figure 4B:
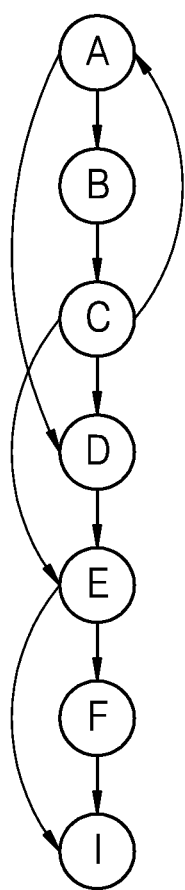
FIG. 4B illustrates an example graph representing the schedule executed during the four days, according to an embodiment of the disclosure.

FIG. 4B illustrates an example graph representing the schedule executed during the four days, according to an embodiment. The representative graph depicts an order of execution of events over the four days of the disclosure.

Referring to FIG. 4B, each of the events A, B, C, D, E, F, and I can be represented by the nodes of the graph. The directions of the edges can indicate the order of execution of the events within the schedule. For simplicity of description, the graph is constructed by linking the nodes—events—using directed edges with respect to the order of execution of the events in the schedule. However, connections between events are considered as permanent, if the weight of the edges connecting the events is greater than the threshold weight.

Figure 4C:
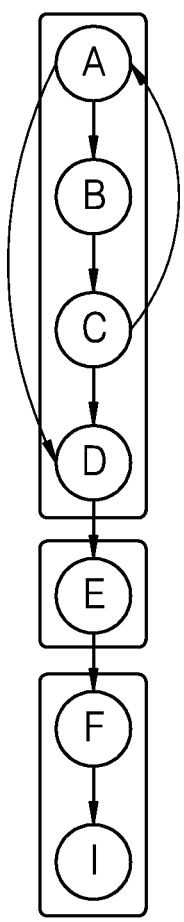
FIG. 4C illustrates determining of a critical event in the example graph, according to an embodiment of the disclosure.

FIG. 4C illustrates determining a critical event in the example graph, according to an embodiment of the disclosure.

Referring to FIG. 4C, the method include identifying event E as the critical event, as the event E can split the schedule into two parts (two sub-schedules). Therefore, the method includes providing a notification which indicates that events of A, B, C, and D have been missed or have not been executed prior to or after the execution of the event E. If the event F is missed, a notification can be provided after a predefined period post the execution of the event I. This is because, the part in which the event F is scheduled to be executed, terminates the schedule. If the event I is missed, a notification can be provided after a predefined period of expected execution of the event I. This is because, the part in which the event I is scheduled for execution terminates the schedule, and the event I terminates the schedule.

Figure 5A:
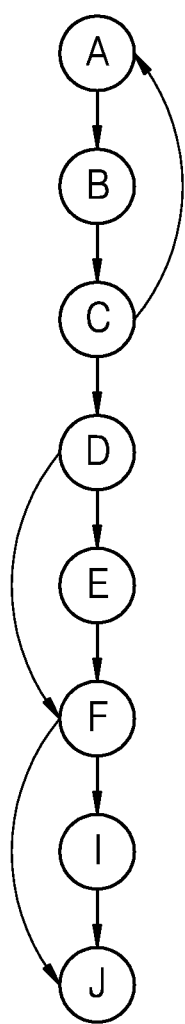
FIG. 5A illustrates an example graph representing a schedule including multiple critical nodes, according to an embodiment of the disclosure.

FIG. 5A illustrates an example graph representing a schedule including multiple critical nodes, according to an embodiment of the disclosure. The representative graph depicts the order of execution of events over a period of time of the disclosure.

Referring to FIG. 5A, the events of A, B, C, D, E, F, I, and J can be represented by the nodes of the graph. The directions of the edges can indicate the order of execution of the events within the schedule.

Figure 5B:
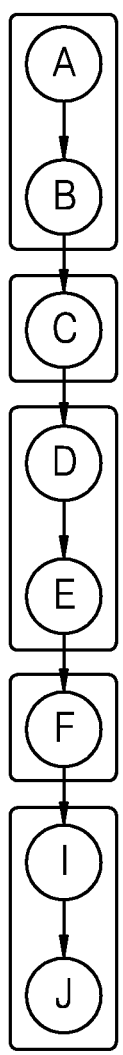
FIG. 5B depicts determination of the critical event in the example graph, according to an embodiment of the disclosure.

FIG. 5B depicts determination of the critical event in the example graph, according to an embodiment of the disclosure.

Referring to FIG. 5B, the method includes identifying events C and F as the critical events. The critical events C and F can split the schedule into three parts (three sub-schedules). If event A and/or B is missed, a notification is provided prior to or after the execution of the event C. Similarly, if event D and/or E is missed, a notification is provided prior to or after the execution of the event F. If the event I is missed, a notification can be provided after a predefined period post the execution of the event J. If either the events I and J or the event J is missed, a notification can be provided after a predefined period of expected execution of the event J.

FIG. 6A illustrates an example of updating critical status of events based on a modification of a schedule, according to an embodiment of the disclosure.

Referring to FIG. 6A, in an example, the schedule is monitored for 5 days and the schedule includes events of A, B, K, C, D, E, F, and I. The order of execution of the events for each day is illustrated in FIG. 6A. The frequency of execution of the events are monitored for 5 days. Referring to FIG. 6A, the events of A, B, D, and E are executed on all 5 days. The events of C and I are executed on 4 days. The event F is executed on 3 days. The event K is executed on 2 days.

FIG. 6B illustrates a graph representing the order of execution of the events over a predetermined time period according to an embodiment of the disclosure.

Referring to FIG. 6A or 6B, the predetermined time period is 5 days. The event E can be identified as a critical event as the event E splits the whole schedule into two parts (two sub-schedules).

Consider that the weight assigned to an edge connecting two events in an order based on the direction of the edge is increased by 1. Based on the monitoring of the frequency of execution of the different events in the schedule, the method may determine that the weight of the edges connecting the event K is less than the threshold weight, which can vary based on the number of days for which the schedule is monitored. The method includes removing the edges connecting the event K as the event K has been executed only once.

FIG. 6C illustrates a graph representing the order of execution of the events over a predetermined time period, according to an embodiment of the disclosure.

Referring to FIG. 6C, the removal of the node K leads to a modification of the schedule. In an embodiment, the critical event is identified in the graph, in which the critical event may split the graph or the schedule into parts. The event D is identified as a new critical node because the event D can split the schedule into two parts.

Figure 7A:
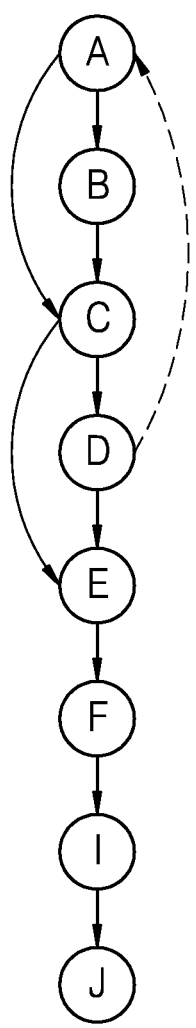
FIG. 7A illustrates another example of updating critical status of events based on a modification of a schedule, according to an embodiment of the disclosure.
Figure 7B:
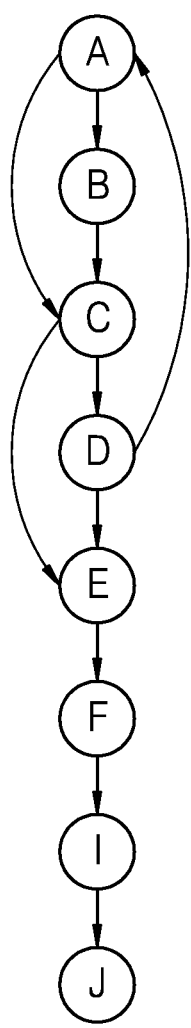
FIG. 7B illustrates another example of updating critical status of events based on a modification of a schedule, according to an embodiment of the disclosure.

FIGS. 7A and 7B illustrate another example of updating critical status of events based on a modification of a schedule, according to various embodiments of the disclosure.

In an example, the schedule is monitored for a predetermined period of time. Referring to FIG. 7A, the graph represents the order of execution of the events over the predetermined period of time. The schedule includes events of A, B, C, D, E, F, I, and J. The events C and E may be identified as critical events. A notification can be provided prior to or after the execution of the event C, if the events A and B are missed. Similarly, if the event D is missed, a notification can be provided to a user prior to or after the execution of the event E. The events C and E can split the schedule into three parts (three sub-schedules).

In an embodiment, probabilities for the events in the schedule to be qualified as a critical node are determined or calculated during the monitoring of the schedule. Initially, the event C is selected and determined as the critical event. Considering that the execution of the event A is detected after the execution of the event D. As a result, a temporary edge directed from D to A can be added between the events D and A. The dotted nature of the temporary edge can signify that the weight of the temporary edge is less than the threshold weight.

In an embodiment, the method can subsequently monitor an execution of the event D followed by an execution of the event A. As a result of the executions, the weight of the temporary edge increases. If the weight of the temporary edge increases, due to the increased frequency of execution of event D followed by the execution of event A, the probability of the event C to be qualified as a critical event decreases. If the weight of the dotted edge equals the threshold weight, the dotted edge can become a permanent edge, as illustrated in FIG. 7B. At this stage, the event C can be no longer qualified as critical as an edge passes over the event C.

Referring to FIG. 7B, the inclusion of the edge between the events D and A leads to a modification of the schedule, according to an embodiment. The method can identify that the event C can be no longer qualified as critical in the graph as an edge traverses from the event D to the event A, bypassing the event C. Accordingly, the event E is identified as the only critical node. If the events of A, B, C and D are missed, a notification is provided to a user prior to or after the execution of the event E.

Figure 8:
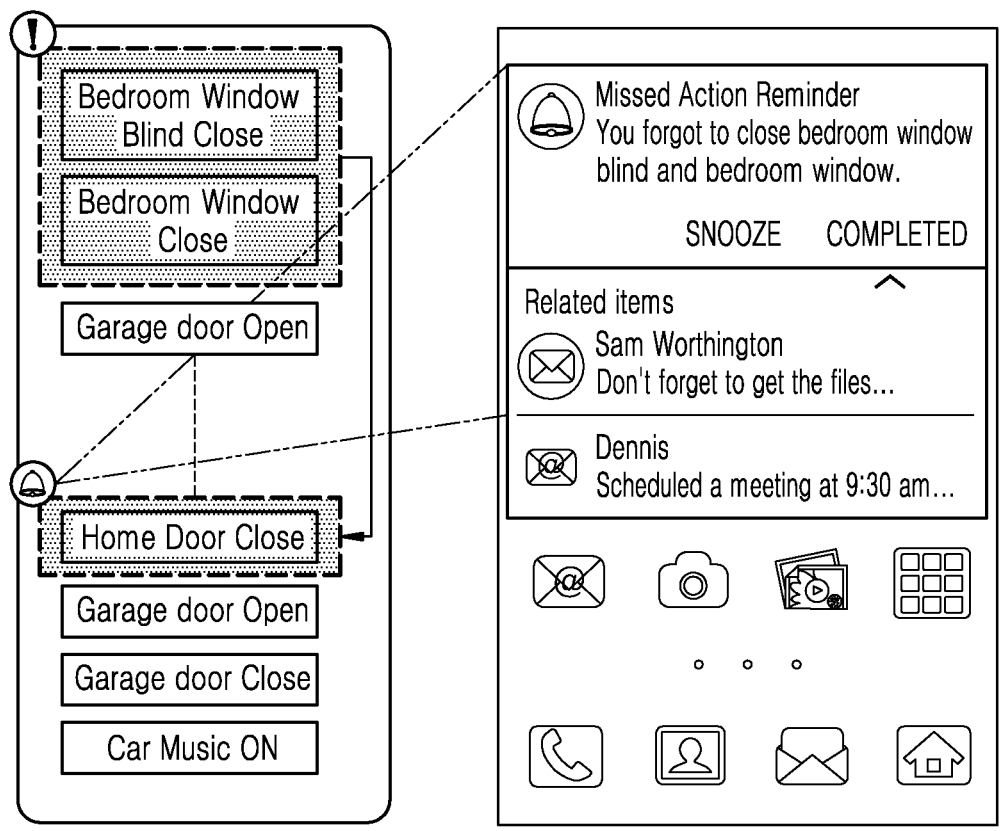
FIG. 8 illustrates an example of providing a notification indicating a non-execution of activities prior to or after an execution of a critical activity, according to an embodiment of the disclosure.

FIG. 8 illustrates an example of providing a notification indicating a non-execution of activities prior to or after an execution of a critical activity, according to an embodiment of the disclosure.

Referring to FIG. 8, an identified schedule may include a plurality of activities (events) to be performed (executed) by a user. In an example, the user has forgotten to perform two activities such as 'bedroom window blind close' and 'bedroom window close'. In an embodiment, the activity of 'home door close' is identified as a critical activity. In an embodiment, the notification of 'Missed Action Remainder' indicating that the user had forgotten to perform the two activities is provided. The 'Missed Action Remainder' can be provided prior to or after executing the activity of 'home door close'.

Figure 9:
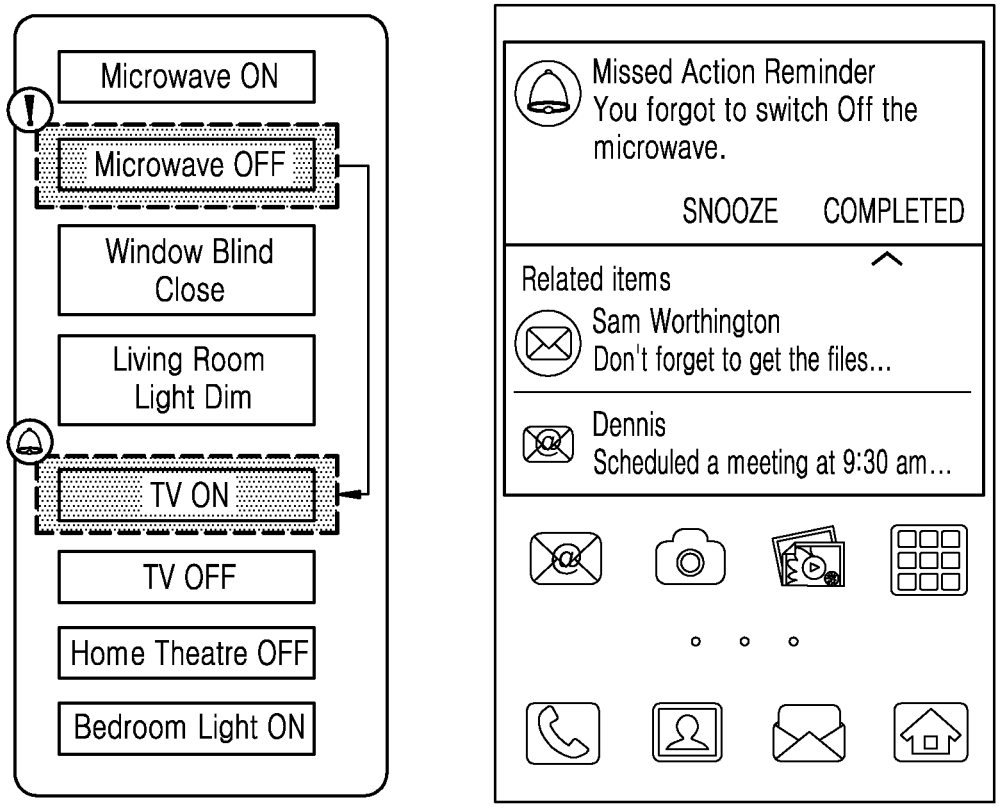
FIG. 9 illustrates another example of providing a notification indicating a non-execution of an activity prior to/after the execution of a critical activity, according to an embodiment of the disclosure.

FIG. 9 illustrates another example of providing a notification indicating a non-execution of an activity prior to/after the execution of a critical activity, according to an embodiment of the disclosure.

Referring to FIG. 9, a plurality of activities are scheduled to be executed by the user. The performance of the activities in the schedule may depend on devices that can be a part of an IoT environment. The devices may include but not limited to, a microwave, a living room light, a TV, a home theatre, a bedroom light, a thermostat, a garage doors, security systems (home/office), windows, and so on.

In an example, the user has forgotten to perform an activity such as 'Microwave OFF'. The method may include identifying 'TV (television) ON' as a critical activity.

In an embodiment, the activity of 'TV ON' can be classified as a critical activity if 'TV ON' is identified as an engaging activity. The activity of 'TV ON' can be identified as an engaging activity by obtaining information of the IoT environment. In order to determine the information of the IoT environment, the device executing the activity may determine the state of the devices while the TV is ON for a period of time (a couple of hours/days). The state of the devices can refer to the operating state of the devices (ON or OFF) and/or pattern of usage of the other devices. In an example, if it is observed, during the monitoring phase, that the bedroom light and the home theater remain OFF while the TV is ON for the period of time, the 'TV ON' may be classified as a critical activity (engaging activity) because the operating state of the other devices executing bedroom light and home theater does not vary but remains OFF.

In another environment, the activity of 'TV ON' can be identified as a critical activity if the time interval between execution of the activity 'TV ON' and the activity succeeding 'TV ON', i.e., 'TV OFF', is greater than a threshold time period.

In an embodiment, the notification, i.e., a 'Missed Action Remainder' indicating that the user had forgotten to switch off the microwave may be provided or displayed. The 'Missed Action Remainder' can be provided prior to or after executing the activity of 'TV ON'. After or before the user switches on the TV, the user may be informed that the user had forgotten to switch off the microwave.

FIG. 10A and illustrates an example of inserting a missed activity to another routine according to an embodiment of the disclosure.

Figure 10B:
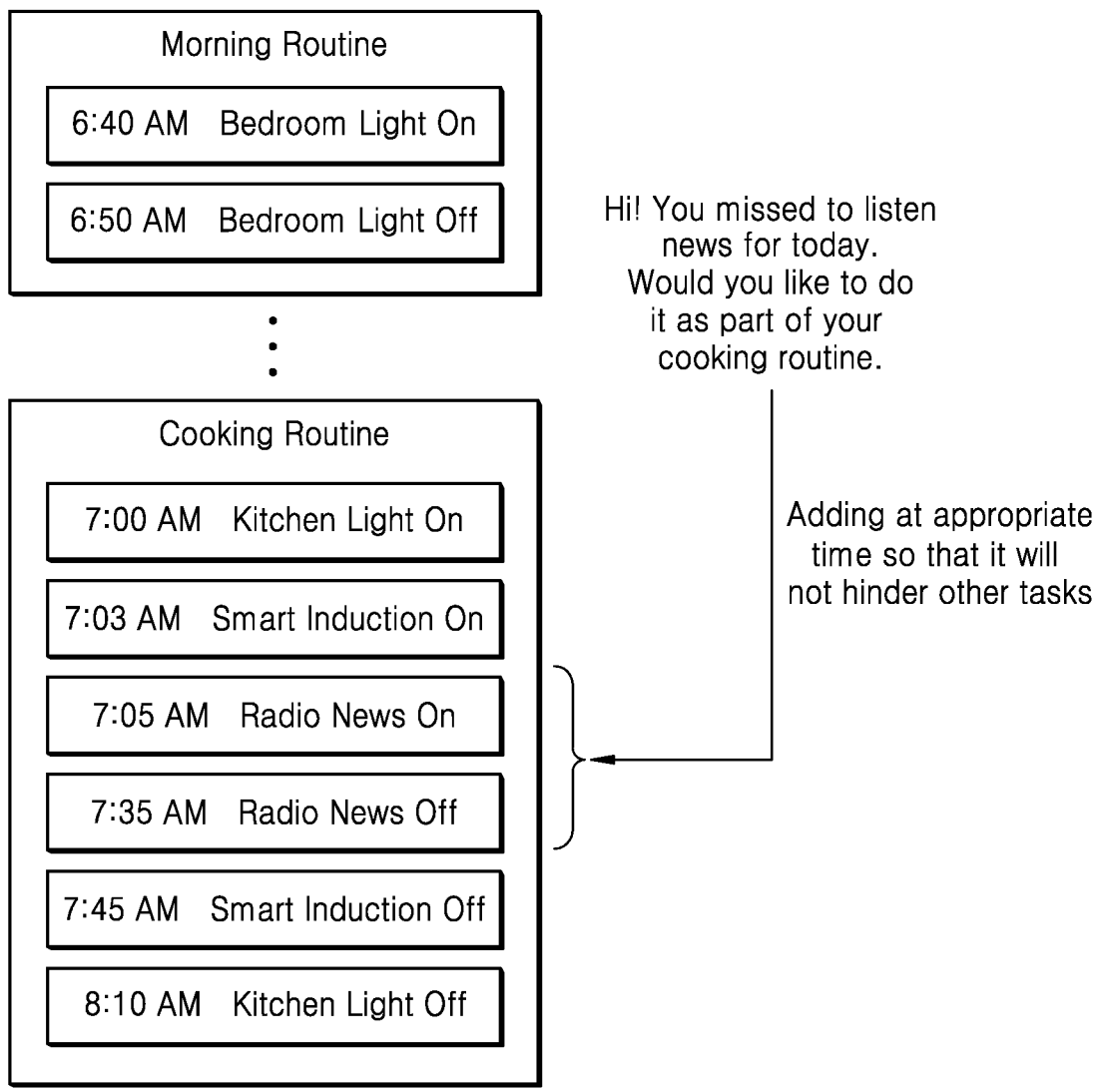
FIG. 10B illustrates another example of inserting a missed activity to another routine according to an embodiment of the disclosure.

FIG. 10B illustrates another example of inserting a missed activity to another routine according to an embodiment of the disclosure;

Referring to FIG. 10A, a schedule regarding a morning routine including a plurality of activities is presented. The scheduled time at which the user is expected to perform the activity is also shown in FIG. 10A. In an embodiment, the activity of listening to the news on radio is missed or not performed in the morning routine. The detected missed activities are 'Radio News ON' and 'Radio News Off'. The activities were supposed to be performed at 6:15 AM and 6:45 AM, respectively.

In an embodiment, activities are identified in another routine, i.e., the cooking routine which would not be bothered by the missed activities such as 'Radio News ON' and 'Radio News Off' which are scheduled prior to the execution of the identified activities, after the execution of the identified activities, or in the middle of the execution of the identified activities.

Referring to FIG. 10B, the activities of 'Smart Induction ON' and 'Smart Induction OFF' are identified as the activities whose execution will not be affected if the missed activities are inserted during their executions. For example, the activity of 'Listening to the News' can be considered as non-hindering activity while cooking. In an embodiment the activities not affected by inserting the missed events may be determined based on a time interval between two consecutive activities where the time interval is greater than a threshold time interval.

The activities included in the morning routine and the cooking routine may be performed by the same user or different users.

In an embodiment, the activities such as 'Smart Induction ON' and 'Smart Induction OFF' in the cooking routine can be identified based on a knowledge base such as ontology, rule, expert systems, statistical corpora, heuristics, and so on.

In another embodiment, the activities of 'Smart Induction ON' and 'Smart Induction OFF' can have a higher probability of co-occurrence with the activities of 'Radio News ON' and 'Radio News Off' compared to other activities in the cooking routine. Therefore, the method may include identifying the activities of 'Smart Induction ON' and 'Smart Induction OFF' as the activities which may not hinder scheduling the missed activities of the morning routine.

In another embodiment, the activities of 'Smart Induction ON' and 'Smart Induction OFF' can be identified based on the quality score associated with them. All activities in the cooking routine can be associated with quality scores. The quality score associated with an activity can be based on an involvement of a user in the activity and an involvement of other user in the environment where the event is executed.

Figure 11:
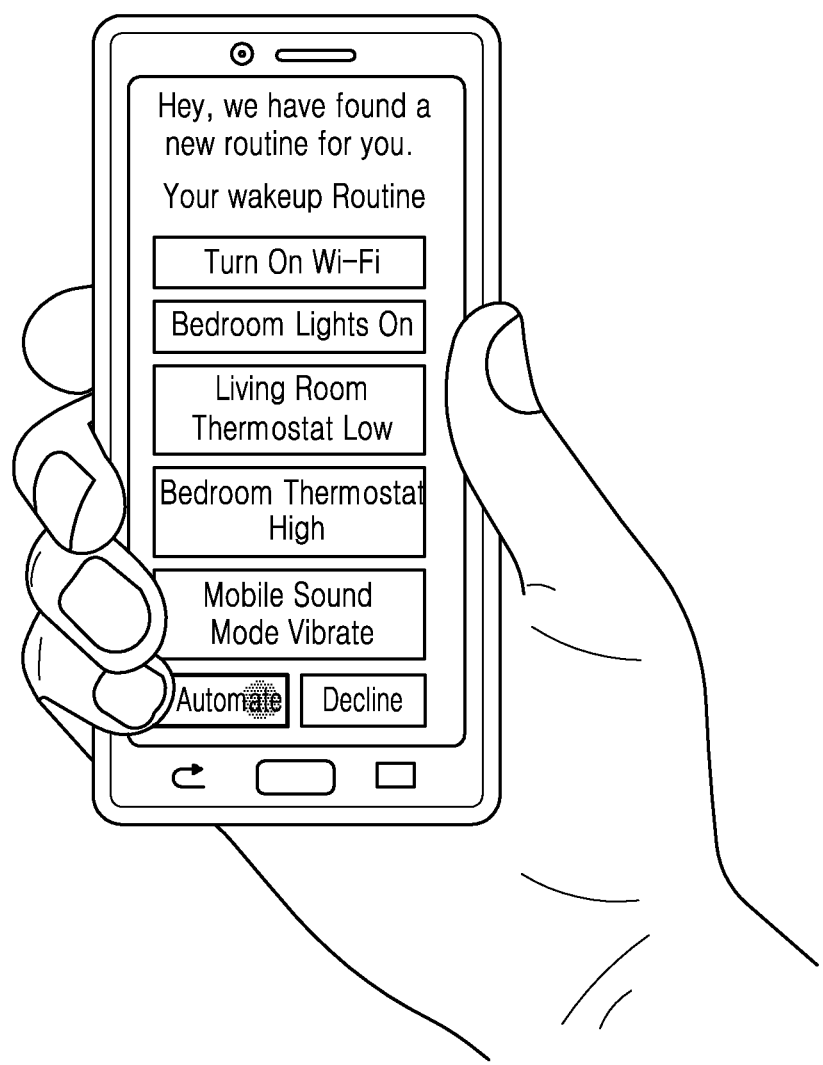
FIG. 11 illustrates an example presentation of a schedule constructed by the device 200, according to an embodiment of the disclosure.

FIG. 11 illustrates an example presentation of a schedule constructed by the device 200, according to an embodiment of the disclosure. In an embodiment, the events executed by the user may be identified and schedules are constructed in background of an electronic device. The schedules may include a plurality of events where at least one identified event is classified as critical. A notification may be provided to the user either prior to or after an execution of the critical event in the constructed schedule. Referring to FIG. 11, the constructed schedule is a morning routine which includes activities such as 'Turn ON Wi-Fi', 'Bedroom lights ON', and so on.

Activities that have been executed by the user over a period of time may be identified in an embodiment. Among the identified activities, the activity of 'Mobile Sound Mode Vibrate' is classified as a critical activity. The morning routine may be presented to the user by providing a notification prior to or post an execution of the activity of 'Mobile Sound Mode Vibrate'.

The user can either choose to either automate the schedule or decline the morning routine. If the user chooses to automate the morning routine, notifications can be provided to the user if the user misses executing at least one activity in the morning routine.

Figure 12:
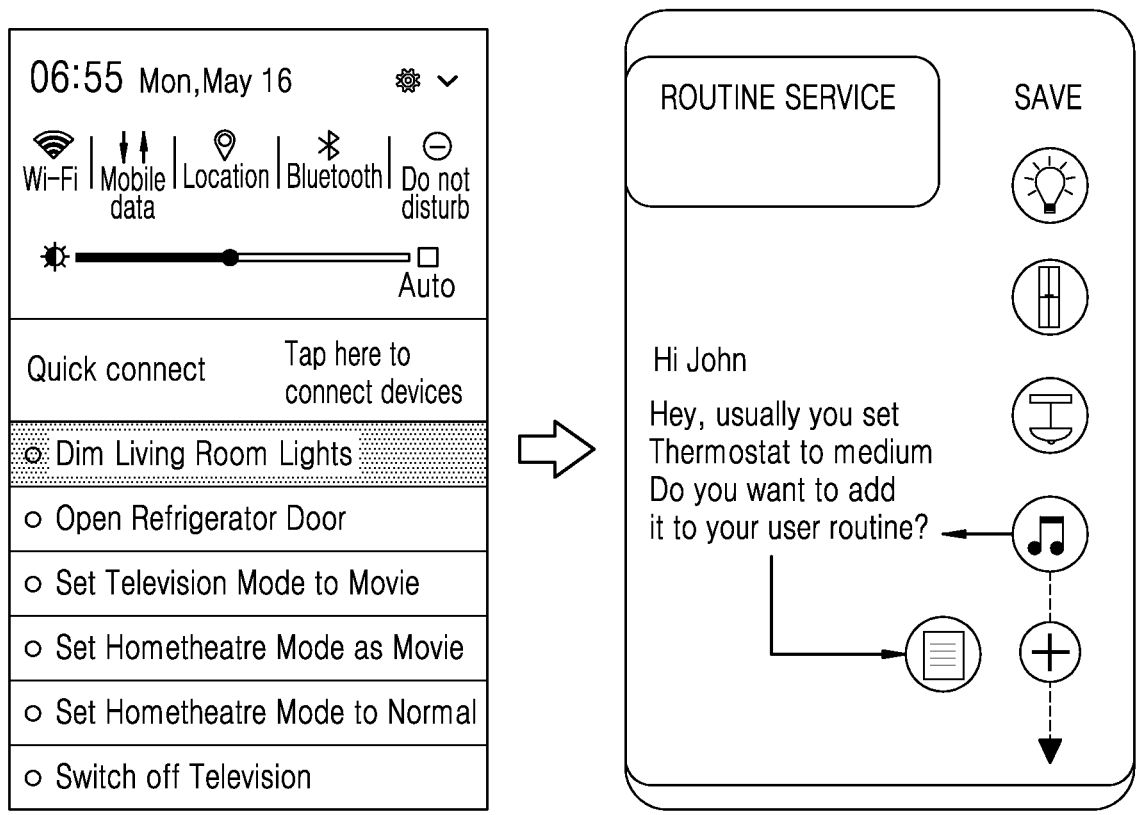
FIG. 12 illustrates an example of modifying a schedule, according to an embodiment of the disclosure.

FIG. 12 illustrates an example of modifying a schedule, according to an embodiment of the disclosure.

In an embodiment, the method may identify events that can be a part of the schedule which is prepared by the user. Referring to FIG. 12, the prepared schedule can be a routine including activities such as 'Dim Living Room Lights', 'Open Refrigerator Door', 'Set Television Mode to Movie', and so on. The routine may include a critical activity (labeled as CA). The critical activity can be 'Set Hometheatre Mode as Movie'. The activities of 'Set Hometheatre Mode to Normal' and 'Switch Off Television' are scheduled for execution after the execution of the critical activity.

In an embodiment, the method may include suggesting the user to modify the routine by including a suitable activity (event) in the routine. The suitable activity may be 'Set Thermostat to Medium'. The activity of 'Set Thermostat to Medium' can be identified as suitable to be included in the routine if it is detected that the user has been performing the activity of 'Set Thermostat to Medium' for a predefined period of time. The method may further include suggesting the user to include the activity of 'Set Thermostat to Medium' by providing a notification prior to the execution of the activity of 'Set Home theatre Mode as Movie'.

An activity within a schedule may involve activities that cannot be executed remotely or automatically. In an example, consider that the activity is closing a window which has only a proximity sensor. As such, the activity of closing the window may not be executed remotely. In such cases, the method may provide a real time missed action reminder which prompts to the user that the user has missed to close the window.

In an embodiment, the method can be a part of elderly care service as providing notifications at an appropriate time. The elderly care service can facilitate elders who are living alone and likely to forget performing certain scheduled activities. In an example, if an elder forgets or misses to take prescribed medicine or forgets to switch off all lights prior to sleeping, the method according the embodiment can identify that the moment of 'going to sleep' can be the appropriate time to provide the notifications. Therefore, when the elder user goes to sleep, the notifications can be provided to the elder regarding any missing activity. The method can be used for providing emergency services in an embodiment.

A method for providing reminders for events in an Internet of Things (IoT) environment is provided. The method includes identifying at least one critical event in a schedule, wherein the at least one critical event splits the schedule into a plurality of parts; detecting at least one missed event within a part amongst the plurality of parts, wherein the detection comprises at least one of execution of an event subsequent to the at least one missed event and non-execution of the at least one missed event; and providing a reminder indicating non-execution of the at least one missed event at one of prior to and after execution of a critical event, among the at least one critical event, wherein the critical event is scheduled for execution after execution of all events in the part.

In an embodiment, the method further includes detecting at least one missed event within a part terminating the schedule, wherein the detection is confirmed by one of execution of an event subsequent to the at least one missed event and non-execution of the at least one missed event; determining that an event terminating the schedule is executed; and providing a reminder, indicating non-execution of the at least one missed event, after a predefined time period.

In an embodiment, the method further includes monitoring the order of execution of the plurality of events in the schedule and frequency of execution of each of the plurality of events over a period of time; modifying the schedule based on the frequency of execution of each of the plurality of events and based on the order of execution of the plurality of events; determining suitability of each of the plurality of events to be critical events based on the modification of the schedule; and identifying the at least one critical event based on one of an obtained user selection and the determined suitability.

In an embodiment, the user selection is obtained by displaying prospective critical events, wherein the prospective critical events are identified based on the determined suitability; receiving a selection indicating at least one prospective critical event, amongst the prospective critical events, as critical; and identifying the at least one prospective critical event as critical.

In an embodiment, the identified schedule includes a plurality of events, wherein the plurality of events are activities to be performed by at least one IoT device.

In an embodiment, the at least one critical event is at least one engaging activity performed by at least one IoT device.

In an embodiment, the critical event is identified based on a snapshot of the IoT environment, wherein the snapshot indicates state of at least one device in the IoT environment during execution of the critical event, wherein the at least one device is associated with execution of events in the schedule.

In an embodiment, the state includes at least one of state of operation of the at least one device and pattern of usage of the at least one device.

In an embodiment, the critical event is identified based on one of a time interval between execution of the critical event and execution of an event preceding the critical event; and a time interval between execution of the critical event and execution of an event succeeding the critical event.

In an embodiment, the critical event is identified based on detection of execution of at least one event not in the schedule, wherein the at least one event is executed at one of prior to execution of the critical event and after execution of the critical event.

In an embodiment, the method further includes identifying, at least one event in a schedule; scheduling execution of the at least one missed event at one of prior to execution of the at least one event during execution of the at least one event, or post execution of the at least one event; and providing a reminder to initiate execution of the at least one missed event during one of prior to execution of the at least one event, execution of the at least one event, and post execution of the at least one event.

In an embodiment, the at least one event is identified, based on one of a knowledge base and a probability of co-occurrence between the at least one event and the at least one missed event.

In an embodiment, the at least one event is identified amongst events in the schedule based on a quality score, wherein quality scores are associated with the events in the schedule.

In an embodiment, the quality scores are based on at least one of involvement of a user in each of the events and activity of at least one user in the IoT environment.

In an embodiment, the method further includes transmitting the reminder to a remote device through a cloud server.

In an embodiment, provided is a method for providing reminders for events in an Internet of Things (IoT) environment. The method includes detecting at least one missed event within a first schedule, wherein the first schedule comprises of a plurality of events; scheduling execution of the at least one missed event at one of: prior to execution of an event in a second schedule and post execution of the event in the second schedule, wherein the second schedule comprises of a plurality of events; and providing a reminder to initiate execution of the at least one missed event at one of prior to execution of the event in the second schedule during execution of the event in a second schedule, and post execution of the event in a second schedule.

In an embodiment, the plurality of events in the first schedule and the plurality of events in the second schedule are executed by a first user.

In an embodiment, the plurality of events in the first schedule is executed by the first user and the plurality of events in the second schedule are executed by a second user.

In an embodiment, provided is a method of presenting a schedule. The method includes constructing a schedule comprising of a selected plurality of events based on monitoring of execution of events over a predefined time period, wherein the schedule comprises of a critical event segmenting the schedule into a plurality of parts; and providing a notification to present the schedule at one of prior to execution of the critical event and after the execution of the critical event.

In an embodiment, the method further includes receiving a selection indicating one of acceptance for automating the schedule and decline for automating the schedule.

In an embodiment, provided is a method for suggesting modifications within a schedule. The method includes detecting an event as suitable to be included in the schedule, wherein the schedule includes a critical event, wherein the schedule is constructed by a user; and provide a notification suggesting the user to include the suitable event in the schedule, prior to execution of the critical event.

In an embodiment, the suitability of the event to be included in the schedule is determined based on detection of execution of the event over a predefined period of time.

In an embodiment, provided is a device 200 providing reminders for events in an Internet of Things (IoT) environment. The device 200 is configured to identify at least one critical event in a schedule, wherein the at least one critical event splits the schedule into a plurality of parts; detect at least one missed event within a part amongst the plurality of parts, wherein the detection comprises at least one of execution of an event subsequent to the at least one missed event and non-execution of the at least one missed event; and provide a reminder indicating non-execution of the at least one missed event at one of prior to and after execution of a critical event, among the at least one critical event, wherein the critical event is scheduled for execution after execution of all events in the part.

In an embodiment, the device 200 is further configured to detect at least one missed event within a part terminating the schedule, wherein the detection is confirmed by one of execution of an event subsequent to the at least one missed event and non-execution of the at least one missed event; determine that an event terminating the schedule is executed; and providing a reminder indicating non-execution of the at least one missed event after a predefined time period.

In an embodiment, device 200 is further configured to monitor the order of execution of the plurality of events in the schedule and frequency of execution of each of the plurality of events over a period of time; modify the schedule based on the frequency of execution of each of the plurality of events and based on the order of execution of the plurality of events; determine suitability of each of the plurality of events to be critical events based on the modification of the schedule; and identify the at least one critical event based on one of an obtained user selection and the determined suitability.

In an embodiment, the user selection is obtained by displaying prospective critical events, wherein the prospective critical events are identified based on the determined suitability; receiving a selection indicating at least one prospective critical event, amongst the prospective critical events, as critical; and identifying the at least one prospective critical event as critical.

In an embodiment, the identified schedule includes a plurality of events, wherein the plurality of events are activities to be performed by at least one IoT device.

In an embodiment, the at least one critical event is at least one engaging activity performed by at least one IoT device.

In an embodiment, the critical event is identified based on a snapshot of the IoT environment, wherein the snapshot indicates state of at least one device in the IoT environment during execution of the critical event, wherein the at least one device is associated with execution of events in the schedule.

In an embodiment, the state includes at least one of state of operation of the at least one device and pattern of usage of the at least one device.

In an embodiment, the critical event is identified based on one of a time interval between execution of the critical event and execution of an event preceding the critical event; and a time interval between execution of the critical event and execution of an event succeeding the critical event.

In an embodiment, provided is a device 200 for presenting a schedule. The device 200 is configured to construct a schedule comprising of a selected plurality of events based on monitoring of execution of events over a predefined time period, wherein the schedule comprises of a critical event segmenting the schedule into a plurality of parts; and provide a notification to present the schedule at one of prior to execution of the critical event or after the execution of the critical event.

In an embodiment, provided is a device 200 for suggesting modifications within a schedule. The device 200 is configured to detect an event as suitable to be included in the schedule, wherein the schedule includes a critical event, wherein the schedule is constructed by a user; and provide a notification suggesting the user to include the suitable event in the schedule, prior to execution of the critical event.

The embodiments disclosed herein can be implemented through at least one software program running on at least one hardware device and performing network management functions to control the network elements. The network components shown in FIG. 2 include blocks which can be at least one of a hardware device, or a combination of hardware device and software module.

The embodiments disclosed herein describe methods and systems for managing delivery of notifications for at least one missed or unexecuted event within an identified schedule. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written, for example, in Very High Speed Integrated Circuit Hardware Description Language (VHDL), another programming language, or implemented by one or more VHDL or several software modules being executed on at least one hardware device. The hardware device can be any kind of portable device that can be programmed. The device may also include means which could, for example, be hardware means such as an application specific integrated circuit (ASIC), or a combination of hardware and software means, such an ASIC and a field programmable gate array (FPGA), or at least one microprocessor and at least one memory with software modules located therein. The method embodiments described herein could be implemented partly in hardware and partly in software. Alternatively, the disclosure may be implemented on different hardware devices, for example, by using a plurality of central processing units (CPUs).

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of managing a missed event in an Internet of Things (IoT) environment, the method comprising:
   determining a sequence of events executed by a user;
   identifying a first event among the sequence of events as a critical event used to perform a missed event, wherein the critical event is determined in response to a time interval between the first event and a second event subsequent to the first event exceeding a predetermined time;
   detecting the missed event among the sequence of events;
   determining a significance weight of the missed event; and
   providing a notification to perform the missed event upon initiation of the first event, based on the significance weight of the missed event,
   wherein the performing of the missed event comprises performing the missedevent based on a time interval between at least two events in the sequence of events after the detecting of the missed events.

2. The method of claim 1, further comprising:
   identifying, within the sequence of events, an action of prompting a notification of the missed event.

3. The method of claim 1,
   wherein the identifying of the first event among the sequence of events as the critical event comprises classifying the first event as the critical event based on information of the IoT environment, and
   wherein the information of the IoT environment comprises at least one of a state of devices included in the IoT environment or a usage pattern of the devices included in the IoT environment.

4. The method of claim 3, wherein the classifying of the first event as the critical event comprises classifying the first event as the critical event based on the state of the devices included in the IoT environment not changing for a predetermined time period.

5. The method of claim 1, wherein the critical event splits the sequence of events to at least two sub sequence of events.

6. The method of claim 1, further comprising:
determining, among the sequence of events, an event which is least executed for a predetermined time period;
generating a second sequence of events by removing the event from the sequence of events; and
identifying a second critical event among the second sequence of events.

7. The method of claim 1, further comprising: selecting the time interval which is greater than a threshold time interval calculated from the sequence of the events.

8. The method of claim 1, wherein the providing the notification comprises:
providing the notification to perform the missed event to the user based on the significance weight of the missed event or the critical event.

9. The method of claim 8, wherein the providing of the notification to perform the missed event comprises providing the notification to perform the missed event immediately when the significance weight of the missed event is higher than a threshold value.

10. An apparatus for managing a missed event in an Internet of Things (IoT) environment, the apparatus comprising:
a memory; and
at least one processor coupled to the memory and configured to:
determine a sequence of events executed by a user,
identify a first event among the sequence of events as a critical event used to perform a missed event, wherein the critical event is determined in response to a time interval between the first event and a second event subsequent to the first event exceeding a predetermined time,
detect the missed event among the sequence of events,
determine a significance weight of the missed event, and
provide a notification to perform the missed event upon initiation of the first event, based on the significance weight of the missed event, by performing the missed event based on a time interval between at least two events in the sequence of events after the detecting of the missed events.

11. The apparatus of claim 10, wherein
the at least one processor is further configured to:
classify the first event as the critical event based on information of the IoT environment, and
identify the first event among the sequence of events as the critical event, and
wherein the information of the IoT environment comprises at least one of a state of devices included in the IoT environment or a usage pattern of the devices included in the IoT environment.

12. The apparatus of claim 11, wherein the at least one processor is further configured to classify the first event as the critical event based on the state of the devices included in the IoT environment not changing for a predetermined time period.

13. The apparatus of claim 10, wherein the at least one processor is further configured to:
determine, among the sequence of events, an event which is least executed fora predetermined time period;
generate a second sequence of events by removing the event from the sequence of events; and
identify a second critical event among the second sequence of events.

14. The apparatus of claim 10, wherein the at least one processor is further configured to:
detect the missed event within a part terminating a schedule, the detection of the missed event being confirmed by one of execution of an event subsequent to the missed event or non-execution of the missed event;
determine that an event terminating the schedule is executed; and
provide a reminder indicating non-execution of the missed event after a predefined time period.

15. The apparatus of claim 14, wherein the at least one processor is further configured to:
monitor an order of execution of events in the schedule and frequency of execution of each of the events over a period of time;
modify the schedule based on the frequency of execution of each of the events and based on the order of execution of the events;
determine a suitability of each of the events to be a critical event based on the modification of the schedule; and
identify the critical event based on one of an obtained user selection and the determined suitability.

16. The apparatus of claim 15, wherein the identified critical event comprises at least one activity performed by at least one IoT device.

17. A non-transitory computer program product comprising a computer readable storage medium having a computer readable program stored therein, the computer readable program, when executed on an electronic device, causing the electronic device to perform:
determine a sequence of events executed by a user;
identify a first event among the sequence of events as a critical event used to perform a missed event, wherein the critical event is determined in response to a time interval between the first event and a second event subsequent to the first event exceeding a predetermined time;
detect the missed event among the sequence of events;
determine a significance weight of the missed event; and
provide a notification to perform the missed event upon initiation of the first event, based on the significance weight of the missed event,
wherein the performing of the missed event comprises performing the missed event based on a time interval between at least two events in the sequence of events after the detecting of the missed events.

* * * * *